UNITED STATES PATENT OFFICE.

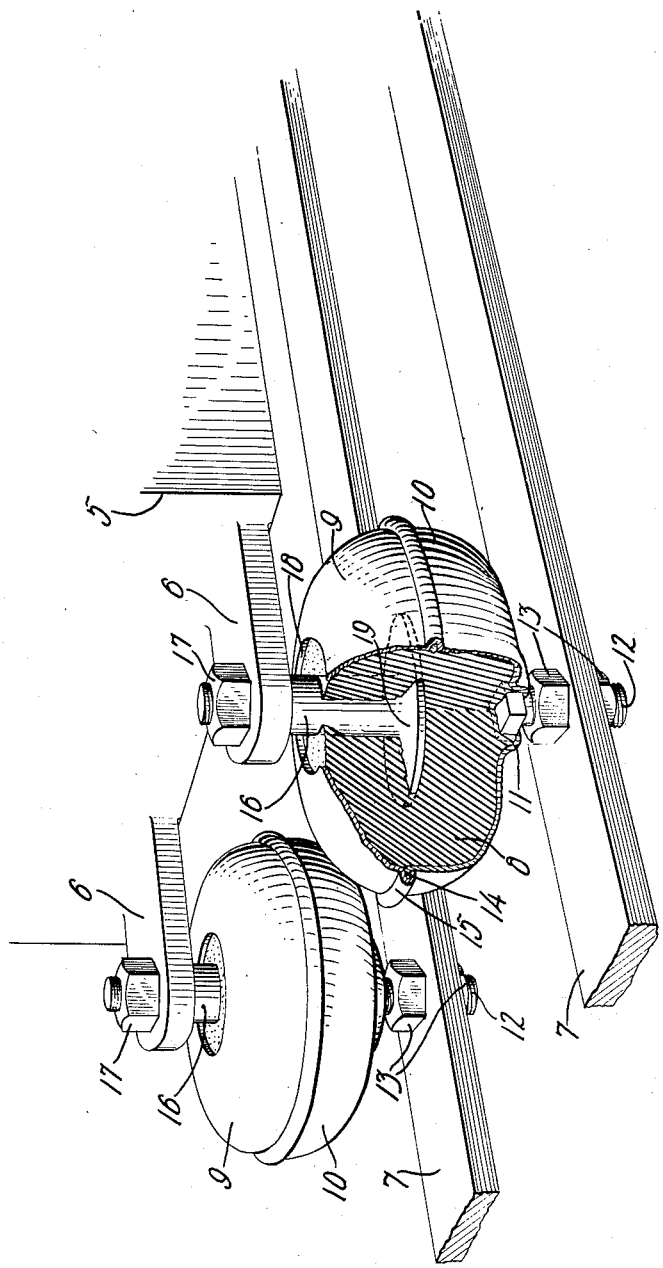

HARRY R. MENEFEE, OF GLEN RIDGE, NEW JERSEY, ASSIGNOR TO WESTERN ELECTRIC COMPANY, INCORPORATED, OF NEW YORK, N. Y., A CORPORATION OF NEW YORK.

SUPPORT.

1,387,288.   Specification of Letters Patent.   Patented Aug. 9, 1921.

Application filed December 29, 1919. Serial No. 348,230.

*To all whom it may concern:*

Be it known that I, HARRY R. MENEFEE, a citizen of the United States, residing at Glen Ridge, in the county of Essex, State of New Jersey, have invented certain new and useful Improvements in Supports, of which the following is a full, clear, concise, and exact description.

This invention relates in general to supports and more particularly to a cushion support for mounting delicate apparatus in places subjected to jarring or vibration.

It is oftentimes necessary to use very delicate apparatus in places where such apparatus is subjected continuously to vibration which not only shortens the life of the apparatus but appreciably affects its operation. An example of such a condition is the delicate apparatus used for wireless telephone communication on airplanes and motor boats. On airplanes, there is not only the continual vibration to be contended with but also the possibility of severe jarring upon landing. Similarly, in connection with apparatus mounted on motor boats or submarine chasers, the apparatus is subjected to continual vibration which, unless special precautions are taken, prevents the satisfactory operation of the apparatus as a whole.

Heretofore, it has been the customary practice to provide individual flexible mountings for the vacuum tubes or other pieces of apparatus most susceptible to vibration or jarring.

It is the object of the present invention, however, to provide cushion supports for the sets in which such apparatus is mounted, their supports being rigidly connected to the airplane, motor boat or other vehicle upon which the apparatus is to be mounted and so arranged that the desired apparatus may be easily placed in position or removed.

It is a further object of the invention to provide such a support which will serve efficiently to take up vibrations occurring in any direction relative to the apparatus. This and other features of the invention may be more clearly understood by referring to the accompanying drawing in which there is shown a pair of cushion supports embodying this invention, one being partially in section, arranged to secure an apparatus box upon a pair of planks which may be the flooring of the fuselage of an airplane or mounting strips rigidly secured to an airplane, motor boat or other body subjected to severe vibration.

Referring now to the drawing, there is shown an apparatus box 5 containing the apparatus which it is desired to protect from excessive vibration. This box contains a plurality of mounting lugs 6—6 by means of which it is mounted to the planks 7—7 which may be a portion of the flooring of an airplane fuselage. The cushion support embodying this invention consists of a substantially spherical body portion 8 of soft rubber or other similar material inclosed by a casing consisting of an upper member 9 and a lower member 10. The lower member 10 is provided with a recessed portion 11 of suitable dimensions to receive the head of a bolt 12, which serves as a mounting lug and is rigidly secured to the plank 7 by means of the nuts 13—13. The member 10 is also provided at its perimeter with a right-angled flange portion 14 and the member 9 is provided with a similar flanged portion 15 which is crimped over the flange 14 to securely lock the two members together. A shoulder stud or mounting lug 16 having a disk portion 19 is molded into the rubber portion 8 as shown, and is threaded at one end whereby it may be rigidly secured to the mounting lug 6 by means of the nut 17. The upper member 9 is provided with an opening 18 which provides the desired clearance between the stud 16 and the upper portion of the casing 9.

In the construction as described, a body portion 8 of soft rubber or similar material acts as a flexible coupling between the casing which is rigidly secured to the vibrating body and the stud 16 which is rigidly secured to the apparatus to be protected from excessive vibration. This body portion 8 is so dimensioned as to provide sufficient material between the casing members 9 and 10 and the stud 16 to absorb vibrations traveling in any direction. It has been the practice in employing such supports to secure the studs 12—12 securely in place by means of the nuts 13—13 and to remove the apparatus box 5 by merely loosening the nuts 17—17. The use of such cushion supports permits using standard mountings for all the apparatus in the box 5 and successfully protects such apparatus from excessive vibration resulting from use under the various service conditions referred to.

What is claimed is:

An apparatus support comprising a substantially spherical casing, a body of resilient material inclosed therein, an attachment lug provided at one end with a flange portion centrally located in said body of resilient material and extending through a suitable opening in the casing, and a second attachment lug rigidly secured to the casing in alinement with said first lug and perpendicular to the plane of said flange portion.

In witness whereof I hereunto subscribe my name this 24th day of December, A. D. 1919.

HARRY R. MENEFEE.